Patented Apr. 29, 1941

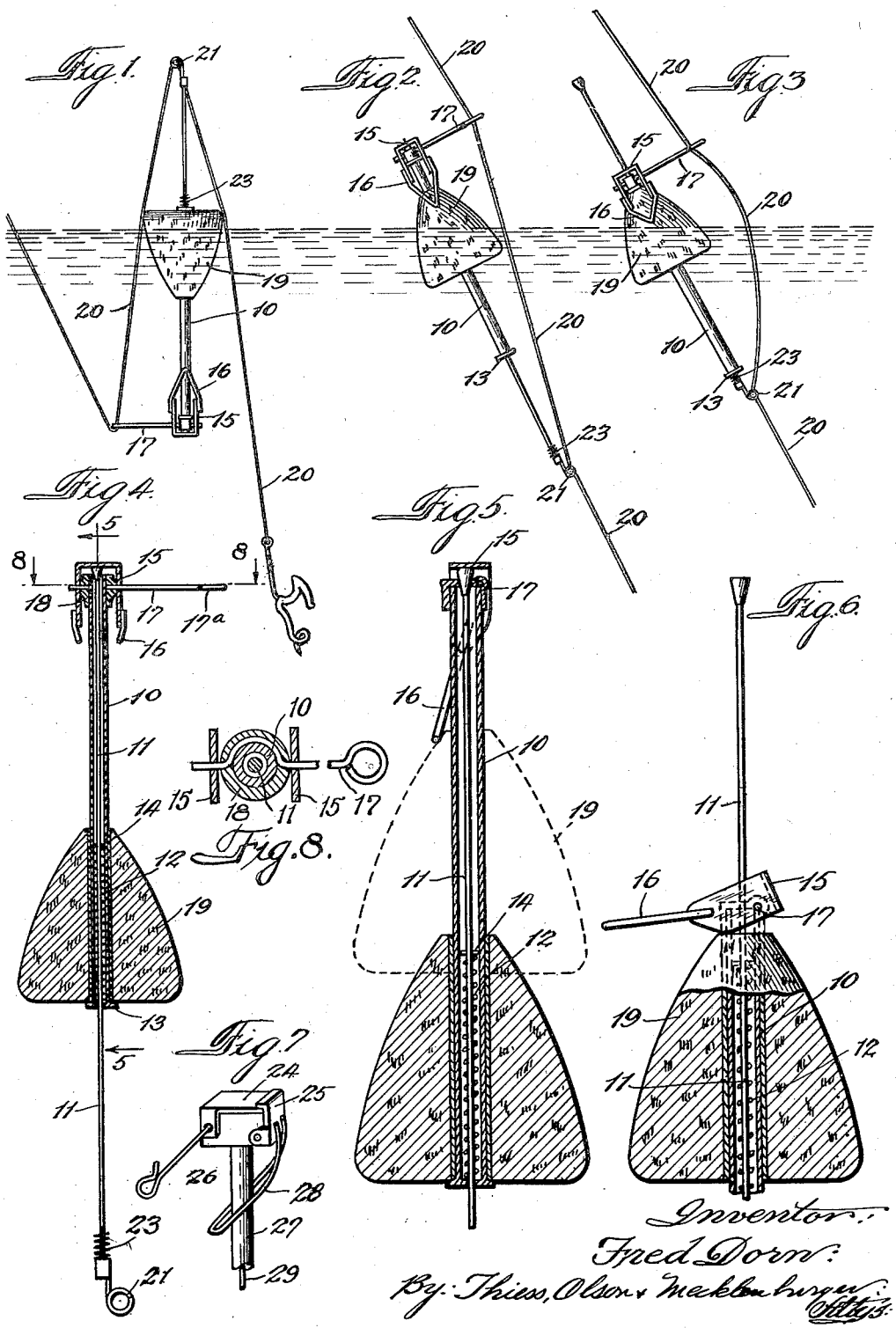

2,239,911

UNITED STATES PATENT OFFICE 2,239,911

FLOAT ACTUATED FISHHOOK SETTER

Fred Dorn, Chicago, Ill.

Application June 15, 1940, Serial No. 340,634

13 Claims. (Cl. 43—49)

This invention relates to a float-actuated fishhook setter, and has special reference to a device for setting a hook in a fish automatically after the bait has been seized and has been run a short distance.

More particularly, this invention relates to a float-actuated fishhook setter comprising a tube having a spring-actuated plunger therein and a trigger movable with respect thereto for holding the plunger in a normal inoperative or cocked condition, there being a float slidable longitudinally on the tube for engaging and for moving the trigger in one position of the float to release the plunger for actuation by the spring thereof to an operative condition for setting the hook in the jaw of the fish.

It is very difficult for some fishermen, particularly those that are inexperienced, to impart to the hook at about the time the fish strikes the quick but rather light pull required to set the hook well into the jaw of the fish. This is particularly true in some forms of fishing where relatively long lines are used, and due to the tidal conditions or to the relative movement of the line and the pole, the resistance of the line causes it to take the form of a large arc so that it is difficult to impart the quick pull necessary for hooking the fish. Even though a fisherman be experienced, if he is using a number of poles or a line with several hooks secured thereto, it is of course quite impossible that the strike of an individual fish be given any particular attention by the fisherman.

While the present invention contemplates the provision of a float for still-fishing, it also contemplates the use of such a float for casting so that the hook may be dropped to rest at a substantial distance from the point where the fisherman may stand. The float also acts in the manner referred to above in trolling or in practically every form of fishing, and particularly where the hook is to be disposed in the water at a substantial distance from the position of the fisherman.

In the usual automatic fishhook setter, none of those of which applicant has knowledge may be cast successfully, since the trigger is actuated directly by the initial pull or strike of the fish. In the present instance, the float actuates the trigger and during the casting motion while out of water, the float maintains its relation with the end of the tube opposite to the trigger end, this end being secured to the hooked line. After the fish strikes and has started to run, the float is inverted and the trigger is actuated by the movement of the float longitudinally on the tube to impart a quick lift to the hooked line to set the hook. The float will always maintain its relation with the end of the tube opposite to the trigger end by centrifugal action in casting, and as the float meets the water it will still maintain its relation therewith because of the trigger end of the tube being heavier than the opposite end.

Aside from the feature of being able to cast, in the construction of the present invention there is a delayed action whereby the trigger does not actuate the plunger to set the hook until after the fish has taken the bait and started to run it. This delayed action is of considerable importance because it gives the fish a chance to strike and run before the trigger is actuated by the float. Without the delayed action, it is possible, if not probable, that the trigger would be released by a mere "nibble" without setting the hook in the jaw of the fish.

One of the objects of this invention is to provide a float-actuated fishhook setter of the character indicated above which is comparatively inexpensive to manufacture, is simple to operate, and is efficient in use.

A further object of this invention is to provide a float-actuated fishhook setter of the type noted above which may be used in still-fishing, casting or trolling, or other related forms of fishing, by reason of the float maintaining its normal relation with respect to the trigger by centrifugal action when casting, or its normal position by force of gravity in resting in the water.

It is a still further object of this invention to provide a float-actuated fishhook setter of the type hereinabove mentioned in which the float directly actuates the trigger mechanism for setting the hook after the fish strikes and runs with the bait.

Other objects and advantages will hereinafter be more particularly pointed out, and for a more complete understanding of the characteristic features of this invention reference may be had to the following description when read together with the accompanying drawing, in which latter:

Fig. 1 is a side elevational view of a construction embodying the features of this invention, the construction being secured to a hooked line and resting in the water in a normal inoperative or cocked condition;

Fig. 2 is a view similar to Fig. 1, showing a changed position of the construction of this invention, the fish having struck the bait and Fig. 3 is a view similar to Fig. 2 after the trigger has been released to set the hook;

Fig. 4 is an enlarged central vertical sectional view of the float-actuated fishhook setter in the condition shown in Fig. 1;

Fig. 5 is a view similar to Fig. 4, taken on the line 5—5 of Fig. 4;

Fig. 6 is a side elevational view of Fig. 5 showing a changed position of the operating mechanism thereof;

Fig. 7 is a perspective view of a modified form of trigger embodying the features of this invention and shown mounted on a fragmentary portion of a tube, and Fig. 8 is a plan sectional view taken on the line 8—8 of Fig. 4.

Referring now more particularly to the drawing, the construction embodying the features of this invention comprises a tube 10 having a plunger 11 slidable longitudinally therein, the plunger 11 being of substantially greater length than the tube 10 to extend beyond one of the ends thereof. The tube 10 may be of circular cross-section and may be formed of metal, plastic, wood or any other substantially rigid material. The plunger 11 is preferably formed of a metal wire, although it may be formed of any other relatively rigid material. Since the construction is to be used in water, it should be borne in mind that a rust-proof material is desirable throughout the elements thereof.

A coil spring 12 is mounted within the tube and about the plunger 11, one end of the coil spring resting against a radially inwardly extending flange 13 or other stop, with the other end resting against a pin 14 extending through the plunger 11. While a pin has been shown, it is quite apparent that the material of the plunger may be deformed or that a disc may be fixed thereto to obtain the same effect as the pin 14. The coil spring 12 disposed between the pin 14 and the flange 13 normally urges the plunger 11 in a direction to extend out of one end of the tube.

A trigger comprising preferably a channel-shaped strap 15 is pivotally secured to an adjacent one end of the tube 10, the strap overlying one end of the tube 10 for engaging and for holding the plunger 11 in an extended position out of the other end of the tube against the compression of the coil spring 12. This position of the construction will hereafter be referred to as the normal inoperative condition thereof.

An arm 16 is fixed to the strap 15 and is movable therewith, the arm extending from the strap to a position adjacent one side of the tube. The arm is shown in the form of a U-shaped wire, the ends of which are soldered, welded or otherwise secured to opposed sides of the strap. The strap is pivotally mounted on a wire guide 17, one end of which guide is soldered or otherwise secured to a collar 18 soldered or otherwise secured to the tube 10. The guide 17 has an eye 17a at the other end thereof through which a line may be loosely passed.

When the tube 10 is held in an upright position and the plunger 11 is manually displaced out of the end of the tube opposite to the trigger-mounted end as shown in Figs. 1, 4 and 5, the weight of the arm 16 moves the strap 15 into a position overlying the end of the tube 10. When the manual pressure is removed from the plunger 11, the strap 15 holds the plunger in a cocked position.

A float 19 of wood, cork, rubber, or any other material used for such purpose is provided with an axial aperture through which the tube 10 may extend, the float 19 being thereby slidable longitudinally of the tube. A radially outwardly extending flange 13 is provided on one end of the tube 10 to limit the movement of the float in one direction. When the float 19 is in the water, as shown in Fig. 1, it occupies a normal inoperative position with the weighted or trigger-mounted end of the tube 10 extending downwardly, the extending end of the plunger therefor being directed upwardly. A line 20 from the pole extends through the eyelet 17a to a closed spring 21, where it is fixed in position with respect to the plunger, the other end of the line 20 having a hook 22 disposed thereon.

When a fish strikes the hook 22 and runs with the bait, the construction is inverted, as is shown in Fig. 2, and a continuous tension on the line 20 moves the tube 10 downwardly therewith and the float 19 slides relatively longitudinally thereon in an upward direction. In Fig. 2 the float is just about to release the trigger, and after release thereof the compression spring 12 moves the plunger 11 to project it out of the trigger-mounted end with a quick jerk to set the hook in the jaw of the fish. A coil spring 23 is disposed on the plunger 11 between the end of the tube 10 and the closed spring 21 to cushion the shock of the plunger in its movement toward the flanged end of the tube 10.

In casting the construction out into the water, the float, by reason of the threading of the line on the construction, occupies a position adjacent the flange 14 of the tube 10 by centrifugal action. After it strikes and settles on the water, the float still occupies such a position because of the fact that the trigger-weighted end of the sleeve is opposite to that of the flanged end. The float settles in the water in the condition shown in Fig. 1. Thereafter, when a fish strikes, the construction is inverted and the trigger is released in the manner above described and illustrated in Figs. 2 and 3.

The trigger shown in Fig. 7 comprises an overlying portion including a plate 24 and a latch 25, the plate and latch being each pivotally secured to an enlarged end portion 26 of a tube 27. An arm 28 in the form of a wire loop straddling the tube 27 is secured to the latch 25 of the overlying portion, the weight of the arm holding the latch in a securing position with respect to the plate 24. As in the previously described embodiment, a spring-actuated plunger 29 is held in a normal inoperative condition by the overlying portion of the trigger until a float (not shown) moves the arm 28 to release the latch 25 from the plate 24.

While but two embodiments of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. In a device of the character described, a tube, a spring-actuated plunger in said tube, a trigger movable with respect to said tube for holding said plunger in an inoperative condition, and a float slidable on said tube, said float engaging and moving said trigger in one position of said float to release said plunger for actuation by the spring thereof to an operative condition.

2. In a device of the character described, a tube, a spring-actuated plunger in said tube, a trigger pivotally mounted on said tube for holding said plunger in an inoperative condition, and a float slidable on said tube, said float engaging and pivoting said trigger in one position of said float to release said plunger for actuation by the spring thereof to an operative condition.

3. In a device of the character described, a tube, a spring-actuated plunger in said tube, a trigger movable on one end of said tube for engaging one end of said plunger to hold the plunger in an inoperative condition, and a float slidable on said tube, said float engaging and moving said trigger in one position of said float to release the end of said plunger for actuation by the spring thereof to an operative condition.

4. In a device of the character described, a tube, a spring-actuated plunger in said tube, a trigger pivotally mounted to and adjacent one end of said tube, said trigger comprising a portion overlying one end of said tube and having an arm extending therefrom, said overlying portion engaging and holding said plunger in an inoperative condition, and a float slidable on said tube, said float engaging and pivoting said arm out of engagement with said plunger in one position of said float to release said plunger for actuation by the spring thereof to an operative condition.

5. In a device of the character described, a tube, a spring-actuated plunger slidable longitudinally in said tube, a trigger movable with respect to and disposed adjacent one end of said tube, said trigger comprising a channel-shaped member enveloping one end of said tube and an arm extending therefrom on one side of said tube, said channel shaped member engaging and holding said plunger in an inoperative condition, and a float slidable on said tube, said float engaging and moving said arm in one position of said float to release said plunger for actuation by the spring thereof to an operative condition.

6. In a device of the character described, a tube having a stop on one end thereof, a spring-actuated plunger slidable longitudinally in said tube, a trigger movable with respect to said tube for holding said plunger in an inoperative condition, and a float slidable on said tube and limited in one direction of movement by said stop, said float engaging and moving said trigger in the other direction of movement of said float to release said plunger for actuation by the spring thereof to an operative condition.

7. In a device of the character described, a tube, a plunger slidable longitudinally in said tube and being of substantially greater length than said tube to extend beyond an end thereof, a spring for normally urging said plunger in one direction to extend out of one end of said tube, a trigger movable with respect to said tube for holding said plunger in an extended position out of the other end of said tube against the resiliency of said spring, and a float slidable longitudinally on said tube, said float engaging and moving said trigger in one position of said float to release said plunger for actuation by said spring to extend said plunger out of the other end of said tube.

8. In a device of the character described, a tube, a plunger slidable longitudinally in said tube and being of substantially greater length than said tube to extend beyond an end thereof, a spring for normally urging said plunger in one direction to extend out of one end of said tube, a trigger movable with respect to and mounted adjacent one end of said tube for holding said plunger in an extended position out of the other end of said tube against the resiliency of said spring, and a float slidable longitudinally on said tube and normally resting on the end of said tube opposite to the trigger-mounted end, said float engaging and moving said trigger in one position of said float to release said plunger for actuation by said spring to extend said plunger out of said trigger-mounted end of said tube.

9. In a device of the character described, a tube, a plunger slidable longitudinally in said tube and being of substantially greater length than said tube to extend beyond an end thereof, a spring for normally urging said plunger in one direction to extend out of one end of said tube, a trigger pivotally mounted adjacent one end of said tube for engaging and for holding said plunger in an extended position out of the other end of said tube against the resiliency of said spring, and a float slidable longitudinally on said tube and normally holding said trigger-mounted end thereof downwardly in use, said float engaging and pivoting said trigger in a changed position of said float when said trigger-mounted end is inverted to release said plunger for actuation by said spring to extend said plunger out of the other end of said tube.

10. In a device of the character described, a tube, a plunger slidable longitudinally in said tube and being of substantially greater length than said tube to extend beyond an end thereof, a coil spring within said tube for normally urging said plunger in one direction to extend out of one end of said tube, a trigger comprising a portion overlying one end of said tube and movable with respect thereto for engaging and for holding said plunger in an extended position out of the other end of said tube against the compression of said spring, an arm extending from said overlying portion and movable therewith, and a float slidable longitudinally on said tube, said float engaging and moving said arm out of engagement with said plunger in one position of said float to release said plunger for actuation by said spring to extend said plunger out of the other end of said tube.

11. In a device of the character described, a tube, a plunger slidable longitudinally in said tube and being of substantially greater length than said tube to extend beyond an end thereof, a coil spring for normally urging said plunger in one direction to extend out of one end of said tube, a trigger comprising a strap overlying one end of said tube and pivotally secured thereon, said strap engaging and holding said plunger in an extended position out of the other end of said tube against the compression of said spring, an arm fixed to said strap and extending adjacent the side of said tube, and a float slidable longitudinally on said tube, said float engaging and moving said arm and thereby said strap out of engagement with said plunger in one position of said float to release said plunger for actuation by said spring to extend said plunger out of the other end of said tube.

12. In a device of the character described, a tube, a plunger slidable longitudinally in said tube and being of substantially greater length than said tube to extend beyond an end thereof, a spring for normally urging said plunger in one direction to extend out of one end of said tube, a trigger movable with respect to said tube for holding said plunger in an extended position out of the other end of said tube against the resiliency of said spring, said extended end being adapted to hold a hooked line, and a float slidable longitudinally on said tube and adapted to hold said extended end upwardly with relation thereto during normal condition of use, a tension on the hooked line inverting said float, said float in said inverted condition engaging and moving said trigger to release said plunger for actuation by said spring to extend said plunger out of the other end of said tube.

13. In a device of the character described, a tube, a spring-actuated plunger in said tube, a trigger mounted adjacent one end of said tube, said trigger comprising a plate and a latch each pivotally mounted on and co-operating to overlie one end of said tube to engage and to hold said plunger in an inoperative condition, an arm extending from and secured to said latch, and a float slidable on said tube, said float engaging and moving said arm to pivot said latch out of cooperative engagement with said plate in one position of said float to release said plunger for actuation by the spring thereof to an operative condition.

FRED DORN.